United States Patent
Vahidsafa et al.

(10) Patent No.: US 9,569,322 B2
(45) Date of Patent: Feb. 14, 2017

(54) MEMORY MIGRATION IN PRESENCE OF LIVE MEMORY TRAFFIC

(71) Applicant: Oracle International Corporation, Redwood Shores, CA (US)

(72) Inventors: Ali Vahidsafa, Palo Alto, CA (US); Connie Wai Mun Cheung, Sunnyvale, CA (US)

(73) Assignee: Oracle International Corporation, Redwood Shores, CA (US)

( * ) Notice: Subject to any disclaimer, the term of this patent is extended or adjusted under 35 U.S.C. 154(b) by 116 days.

(21) Appl. No.: 14/675,376

(22) Filed: Mar. 31, 2015

(65) Prior Publication Data

US 2015/0278109 A1  Oct. 1, 2015

Related U.S. Application Data

(60) Provisional application No. 61/973,107, filed on Mar. 31, 2014.

(51) Int. Cl.
| | |
|---|---|
| *G06F 12/00* | (2006.01) |
| *G06F 11/20* | (2006.01) |
| *G06F 12/10* | (2016.01) |
| *G06F 3/06* | (2006.01) |
| *G06F 12/06* | (2006.01) |

(52) U.S. Cl.
CPC ......... *G06F 11/2094* (2013.01); *G06F 3/0647* (2013.01); *G06F 11/20* (2013.01); *G06F 11/2069* (2013.01); *G06F 12/0646* (2013.01); *G06F 12/1036* (2013.01); *G06F 2212/656* (2013.01)

(58) Field of Classification Search
CPC .............. G06F 2212/65; G06F 12/1036; G06F 2212/656; G06F 3/0647; G06F 11/2069; G06F 12/0646

USPC .................................................. 711/205, 206
See application file for complete search history.

(56) References Cited

U.S. PATENT DOCUMENTS 9,092,152 B1 *  7/2015  Piszczek ............... G06F 3/0647
9,317,214 B2 *  4/2016  Kolvick ................ G06F 3/0647

FOREIGN PATENT DOCUMENTS

WO       03071419 A2    8/2003
WO     2012160533 A1   11/2012

OTHER PUBLICATIONS

International Search Report and Written Opinion for International Application No. PCT/US2015/023641 mailed Jul. 3, 2015 (11 pages).

* cited by examiner

*Primary Examiner* — Matthew Bradley
(74) *Attorney, Agent, or Firm* — Osha Liang LLP

(57) ABSTRACT

A method for memory migration between addressing schemes, including: receiving a first request to access a first memory address and a second request to access a second memory address; comparing the first memory address and the second memory address with a barrier pointer referencing a barrier address and separating migrated addresses and un-migrated addresses; tagging the first request with a first tag indicative of the first addressing scheme in response to the first memory address being on an un-migrated side of the barrier address; tagging the second request with a second tag indicative of the second addressing scheme in response to the second memory address being on a migrated side of the barrier address; and sending the first request to a first memory controller unit (MCU) and the second request to a second MCU.

20 Claims, 5 Drawing Sheets

US 9,569,322 B2

MEMORY MIGRATION IN PRESENCE OF LIVE MEMORY TRAFFIC

CROSS-REFERENCE TO RELATED APPLICATIONS

This application claims priority under 35 U.S.C. §119(e) to U.S. Provisional Patent Application Ser. No. 61/973,107 filed on Mar. 31, 2014. Accordingly, U.S. Provisional Patent Application Ser. No. 61/973,107 is hereby incorporated by reference in its entirety.

BACKGROUND

In computing, a memory address specified in an access request goes through a mapping operation to determine the corresponding memory location. Program generated addresses need to go through a mapping process to identify the specific hardware component which holds the data. An example of mapping is identifying a specific dual in-line memory module (DIMM), a specific rank, a specific bank, a specific row, etc. Such mapping is usually a function of how the system is built, and depends on configuration information such as which slots are populated with dynamic random-access memory (DRAM) hardware, and what kind of DRAM hardware is present at each populated slot. System configuration information is generally considered static, and any change in DRAM configuration requires a reboot. If the mapping operation needs to change, the typical approach requires a system reboot or all memory traffic to be halted. Such approaches have an adverse impact on users. Regardless, modifying a mapping operation is still sometimes necessary.

SUMMARY

In general, in one aspect, the invention relates to a method for memory migration from a first addressing scheme to a second addressing scheme. The method comprises: receiving, by a coherence ordering unit (COU), a first request to access a first memory address and a second request to access a second memory address; comparing, by the COU, the first memory address and the second memory address with a barrier pointer referencing a barrier address and separating migrated addresses and un-migrated addresses; tagging, by the COU, the first request with a first tag indicative of the first addressing scheme in response to the first memory address being on an un-migrated side of the barrier address; tagging, by the COU, the second request with a second tag indicative of the second addressing scheme in response to the second memory address being on a migrated side of the barrier address; and sending, by the COU, the first request to a first memory controller unit (MCU) and the second request to a second MCU wherein the first MCU interprets the first memory address according to the first addressing scheme in response to the first tag, and wherein the second MCU interprets the second memory address according to the second addressing scheme in response to the second tag.

In general, in one aspect, the invention relates to a system for memory migration from a first addressing scheme to a second addressing scheme. The system comprises: a user application configured to: issue a first request to access a first memory address; and issue a second request to access a second memory address; a coherence ordering unit (COU) comprising a barrier pointer referencing a barrier address and configured to: compare the first memory address and the second memory address with the barrier address, wherein the barrier address separates migrated addresses and un-migrated addresses; place a first tag indicative of the first addressing scheme on the first request in response to the first memory address being on an un-migrated side of the barrier address; and place a second tag indicative of the second addressing scheme on the second request in response to the second memory address being on a migrated side of the barrier address; and a first memory controller (MC) connected to the COU and configured to interpret the first request according to the first addressing scheme in response to the first tag; and a second MC connected to the COU and configured to interpret the second request according to the second addressing scheme in response to the second tag.

In general, in one aspect, the invention relates to a system for memory migration from a first addressing scheme to a second addressing scheme. The system comprises: a user application configured to: issue a first request to access a first memory address; and issue a second request to access a second memory address; a coherence ordering unit (COU) configured to: modify a barrier pointer to reference a barrier address; compare the first memory address and the second memory address with the barrier address, wherein the barrier address separates migrated addresses and un-migrated addresses; place a first tag indicative of the first addressing scheme on the first request in response to the first memory address being on an un-migrated side of the barrier address; and place a second tag indicative of the second addressing scheme on the second request in response to the second memory address being on a migrated side of the barrier address; a scrubber connected to the COU and configured to: establish a time window in response to the barrier pointer being modified; issue a read request directed towards the barrier address in response to expiration of the time window; receive a value in response to the read request; and issue a write request comprising the value and directed toward the barrier address; a first memory controller (MC) connected to the COU and configured to interpret the first request according to the first addressing scheme in response to the first tag; and a second MC connected to the COU and configured to interpret the second request according to the second addressing scheme in response to the second tag.

Other aspects of the invention will be apparent from the following description and the appended claims.

DETAILED DESCRIPTION

Figure 1:
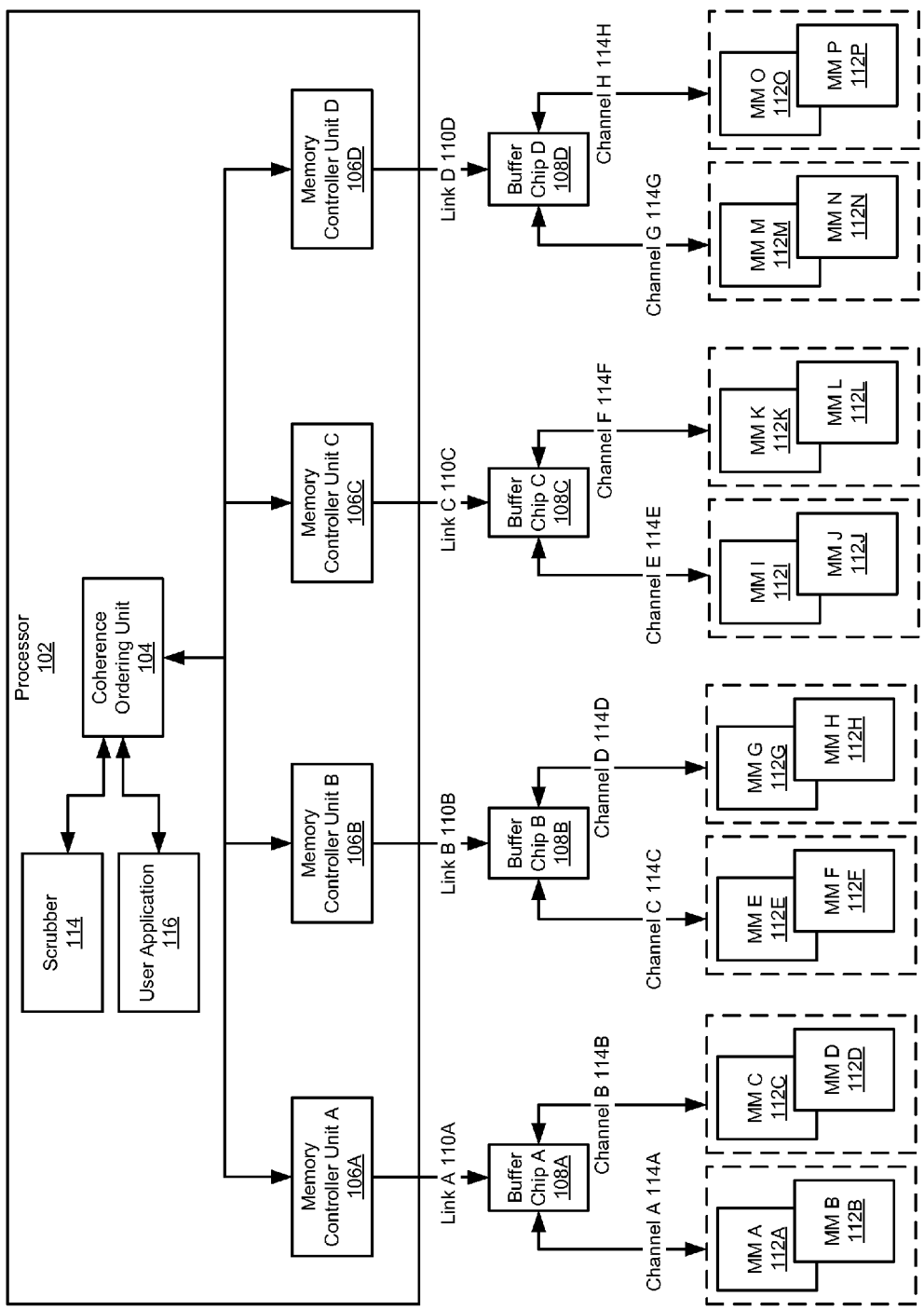
FIG. 1 shows a system in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention relate to a method and system for dynamic remapping of memory addresses in the presence of live memory traffic. Hardware has two mapping schemes programmed in it. Initially all memory is accessed with a first mapping scheme denoted as 'old,' and eventually all memory needs to be accessed with a second mapping scheme denoted as 'new.' Migration is done with the aid of a hardware register called 'barrier.' Barrier register contains a memory address which is compared against all memory traffic. Addresses larger than the barrier and addresses smaller than the barrier are treated differently. One set is considered 'un-migrated,' which means that they must be mapped using the old scheme; and the other set is considered as 'migrated,' which means that they must be mapped using the new scheme. The address in an access request is compared with a barrier pointer referencing a barrier address that separates migrated addresses with un-migrated addresses. If the address falls within the migrated addresses, the access request is tagged-as-migrated and send off for interpretation according to a new addressing scheme. In other words, the access request is tagged with a tag indicative of the new addressing scheme. If the address falls within the un-migrated addresses, the access request is tagged-as-un-migrated and thus interpreted according to the old addressing scheme. In other words, the access request is tagged with a tag indicative of the old addressing scheme. Write requests for the barrier address trigger an update to the barrier pointer.

Specifically, embodiments of the invention relate to the selection of addressing schemes in relation to access requests to the memory modules. Further, embodiments of the invention relate to dynamic memory migration of access requests (e.g., read only access requests, write only access requests, read/write access requests) to addresses in the memory module.

FIG. 1 shows a system in accordance with one or more embodiments of the invention. As shown in FIG. 1, the system includes a processor (102), one or more buffer chips (e.g., buffer chip A (108A), buffer chip B (108B), buffer chip C (108C), buffer chip D (108D)), and one or more memory modules (MMs) (e.g., MM A (112A), MM B (112B), MM C (112C), MM D (112D), MM E (112E), MM F (112F), MM G (112G), MM H (112H), MM I (112I), MM J (112J), MM K (112K), MM L (112L), MM M (112M), MM N (112N), MM O (112O), MM P (112P)). Each component is described below.

In one or more embodiments of the invention, each MM (112A-112P) is an integrated circuit that includes multiple locations for storing content (e.g., data values, cache lines, etc.). Each of these locations is referenced using an address. A user application generates memory reads and writes, and such user generated addresses are mapped by hardware to specific MM locations using configuration information which is set up at boot time. Each MM may be a dual in-line memory module (DIMM). Other types of memory may also be used.

In one or more embodiments of the invention, processor (102) includes one or more memory controller units (MCUs) (e.g., memory controller unit A (106A), memory controller unit B (106B), memory controller unit C (106C), memory controller unit D (106D)). The MCUs (106A-106D) include circuitry necessary to interpret a specified address and identify the corresponding entry/location in the appropriate MM that corresponds to the specified address. In other words, the MCUs (106A-106D) perform mapping operations to map addresses to locations within the MMs. The mapping operation may be referred to as an addressing scheme.

In one or more embodiments of the invention, the MCUs are operatively connected to one or more buffer chips (e.g., buffer chip A (108A), buffer chip B (108B), buffer chip C (108C), buffer chip D (108D)) via one or more links (e.g., link A (110A), link B (110B), link C (110C), link D (110D)). In one or more embodiments of the invention, the buffer chips then connect to a set of two MMs via one or more channels (e.g., channel A (114A), channel B (114B), channel C (114C), channel D (114D), channel E (114E), channel F (114F), channel G (114G), channel H (114H)). Alternatively, in one or more embodiments of the invention, the MCUs may connect directly to the MMs.

In one or more embodiments of the invention, the MCUs (106A-106D) are capable of performing different types of mapping operations. In other words, the MCUs (106A-106D) are configured to handle more than one type of addressing scheme. The access request received by an MCU may indicate the type of addressing scheme to be used (discussed below). For example, a tag may be used to indicate the type of addressing scheme. If the tag attached to the access request indicates the first addressing scheme, the MCU may interpret the address in the access request according to a first addressing scheme. If the tag attached to the access request indicates the second addressing scheme, the MCU may interpret the address in the access request according to a second addressing scheme that is different from the first addressing scheme. For example, the first addressing scheme may be 16 way interleaved mapping, while the second addressing scheme may be 15 way interleaved mapping. Many other addressing schemes are also possible.

In one or more embodiments of the invention, it may become necessary to relocate content in an MM. For example, if an MM is predicted to fail, or has already failed yet the nature of the failure still allows for correction of the data via an error correcting code (ECC), the content in the MM may need to be relocated to new locations in one or more operational MMs. Assume there exists a set of addresses that refer to the memory locations that need to be relocated. Following the relocation, a new addressing scheme may be applied to the set of addresses. In other words, it may be necessary to migrate from a first (old) addressing scheme to a second (new) addressing scheme. However, as the relocation is not instantaneous, the migration between addressing schemes is also not instantaneous. During the migration/relocation process, the first addressing scheme is still applied to addresses referencing locations that have not yet been relocated ("un-migrated addresses"). In contrast, the second addressing scheme is applied to addresses referencing locations that have been relocated ("migrated addresses").

In one or more embodiments of the invention, the processor (102) includes the coherency ordering unit (COU) (104). The COU (104) is a hardware unit within the processor (102) that sees all (or most) memory traffic. COU (104) includes a barrier pointer. The barrier pointer is used during the migration process. Specifically, the barrier pointer references a barrier address within the set of addresses referencing locations that are in the process of being relocated. The barrier address effectively partitions (i.e., separates, groups) the set of addresses into the migrated addresses and the un-migrated addresses. For example, every address "above" the address referenced by barrier pointer may be considered a migrated address. Similarly, every address "below" the address referenced by the barrier pointer may be considered an un-migrated addresses. The barrier address itself may be considered an un-migrated address.

In one or more embodiments, the COU (104) has functionality to receive an access request for any memory location within the MMs. These requests may originate from a user application (116) executing on the processor (102). An access request may correspond to a read only access request, a write only access request, a read/write access request, or any request to manipulate or examine data in a MM. Further, the COU (104) has functionality to compare the address in the access request with the barrier pointer to determine the addressing scheme that should be used to map the address to the memory location. For example, if the address in the access request falls within the migrated addresses, the second addressing scheme should be used to interpret the address. As another example, if the address in the access request falls within the un-migrated addresses, the first addressing scheme should be used to interpret the address. Further still, the COU (104) includes functionality to tag the access request to indicate the appropriate addressing scheme for interpretation.

In one or more embodiments of the invention, when the access request is a write only or read/write request and the memory address specified in the access request is the barrier address, the COU (104) includes functionality to update the barrier pointer to reference the next un-migrated memory address. It is through write requests which match the barrier address, and the subsequent writing of content in the write request to a memory location identified by the second addressing scheme, that the relocation occurs. Those skilled in the art, having the benefit of this detailed description, will appreciate that updating the barrier pointer may include incrementing or decrementing the barrier pointer.

Those skilled in the art, having the benefit of this detailed description, will appreciate that normal memory traffic can automatically cause the barrier pointer to move. However, there are regions of memory which are written to very rarely. In order to guarantee that the migration completes in a predictable amount of time, it is necessary to have a scrubber function, which runs in the background until the migration is completed, that helps the progress of the barrier pointer. The scrubber function detects that the barrier address has not moved for a predetermined time window, and then generates a write access which matches the barrier address. The scrubber functions can be implemented as a hardware state machine, or delegated to a software application (e.g., scrubber application (114)). In one or more embodiments of the invention, the scrubber application (114) executes on the processor (102). The scrubber application (114) includes functionality to create a write access which matches the barrier address, forcing the barrier pointer to update, and thus force the migration to continue, if such an update has not occurred within a predetermined time window. The scrubber application may be separate from the user application that is issuing the access requests. When the barrier pointer is updated to reference a new barrier address, the scrubber application initiates a timer or time window. If the barrier pointer continues to reference the same barrier address for a predetermined time window (e.g., 5 msecs, 10 seconds, 3 cycles, etc.), the scrubber is triggered to issue a read request for the content (i.e., data value) stored in the barrier address, and then issue a write request with the data value for the barrier address. As discussed above, this will force the COU (104) to update the barrier pointer to reference a new barrier address.

Although FIG. 1 shows 16 MMs, $2^N$ MMs or any number of MMs may be used without departing from the invention. Further, while FIG. 1 shows a configuration of components, other configurations may be used without departing from the scope of the invention. For example, various components may be combined to create a single component. As another example, the functionality performed by a single component may be performed by two or more components.

Figure 2:
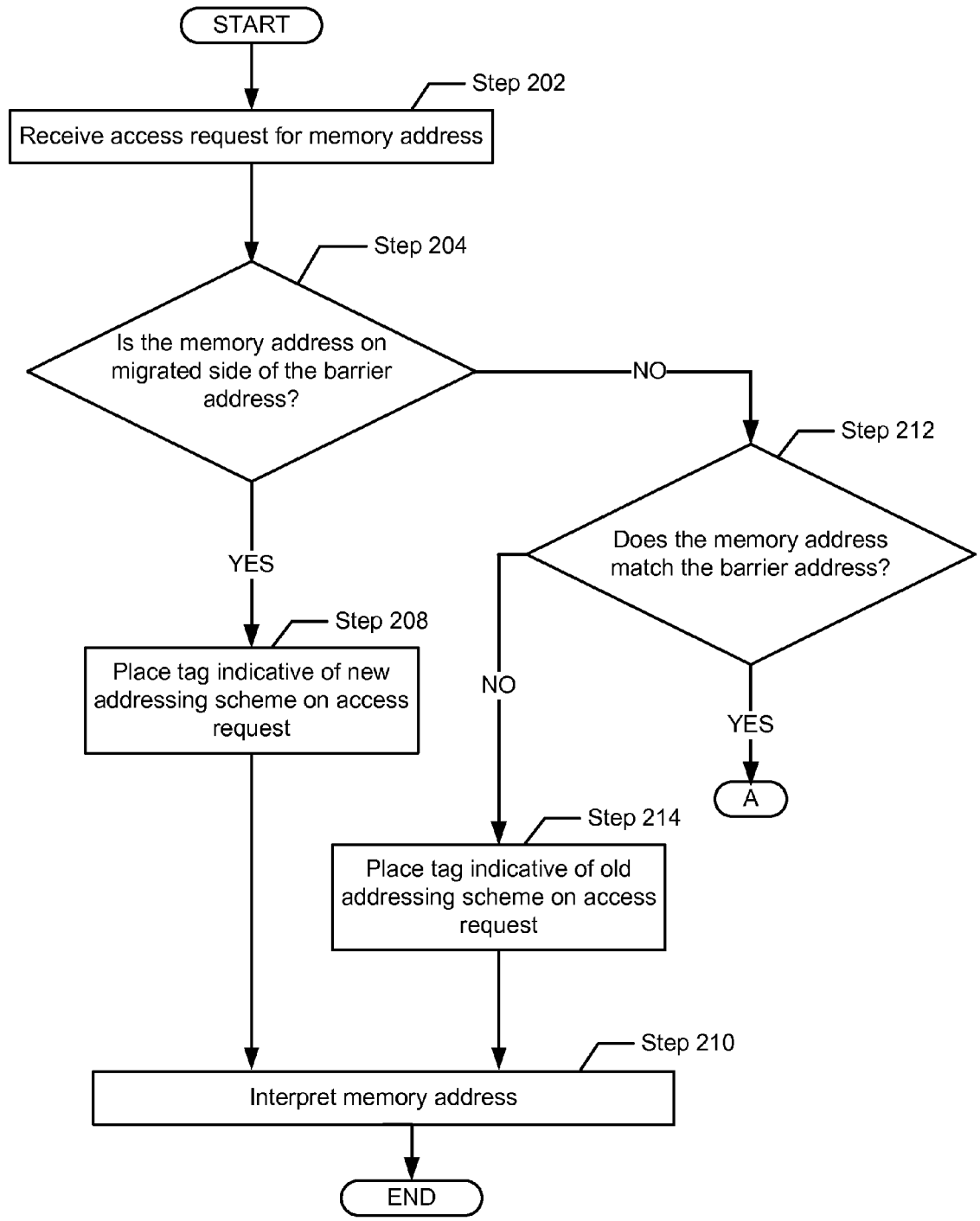
FIG. 2-4 show flowcharts in accordance with one or more embodiments of the invention.

FIG. 2 shows a flowchart in accordance with one or more embodiments of the invention. One or more steps in FIG. 2 may be executed by one or more components in FIG. 1 (e.g., COU (104), scrubber application (114), etc.). While the various steps in this flowchart are presented and described sequentially, one of ordinary skill will appreciate that some or all of the steps may be executed in different orders, may be combined or omitted, and some or all of the steps may be executed in parallel. Furthermore, the steps may be performed actively or passively. For example, some steps may be performed using polling or be interrupt driven in accordance with one or more embodiments of the invention. By way of an example, determination steps may not require a processor to process an instruction unless an interrupt is received to signify that condition exists in accordance with one or more embodiments of the invention. As another example, determination steps may be performed by performing a test, such as checking a data value to test whether the value is consistent with the tested condition in accordance with one or more embodiments of the invention.

Initially, an access request for a memory address is received by the COU (Step 202). The access request may be issued by, for example, a user application, a hardware process, whether migration has not started, has completed, or it is in progress. The access request may be a read request, a write request, or a read/write request. The access request is received during a migration between different addressing schemes.

In Step 204, it is determined whether the memory address specified in the access request is on the migrated side of the barrier address. In other words, the memory address is compared with the barrier pointer referencing the barrier address. As discussed above, the barrier address effectively partitions (i.e., separates, groups) the set of addresses into migrated addresses and un-migrated addresses. When it is determined that the memory address falls within the migrated addresses, the process proceeds to Step 208, where the request is tagged for interpretation under the new addressing scheme. The tagged address request is then sent to the MCUs.

In Step 210, the memory address is interpreted by the MCUs based on the type of a tag (i.e., whether the tag is indicative of the old addressing scheme or the new addressing scheme). As discussed above, the MCUs are configured to handle more than one type of addressing scheme, and the addressing scheme is essentially a mapping operation to identify the corresponding entry/location in the appropriate MM that corresponds to the specified address. The desired addressing scheme is indicated by the type of a tag. For example, an access request arriving directly from Step 204 may be interpreted according to a first addressing scheme because there is no tag attached/appended to the access request. Additionally or alternatively, an access request arriving via Step 208 may be interpreted according to a second addressing scheme because there is a tag attached/appended to the access request.

In Step 212, it is determined whether the memory address specified in the access request matches the barrier address. In other words, the memory address is compared with the barrier pointer referencing the barrier address, and it is determined whether the two addresses are the same. When it is determined that the two addresses are different, the process proceeds to Step 214, where the request is tagged for interpretation under the old addressing scheme. The tagged address request is then sent to the MCUs for interpretation in Step 210. However, when it is determined that the two addresses are the same, the process proceeds to the sub-process discussed below in reference to FIG. 3.

Figure 3:
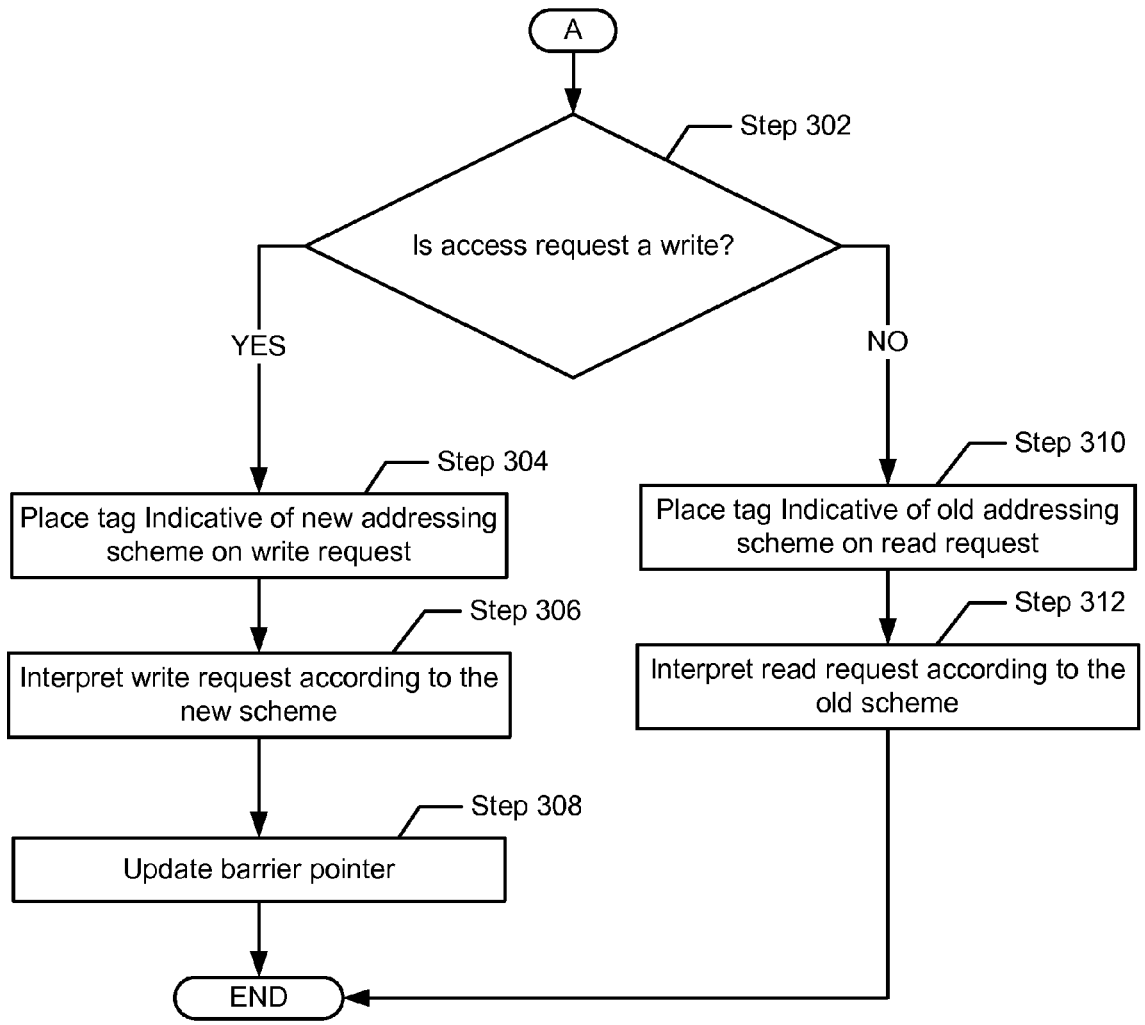

FIG. 3 shows a flowchart in accordance with one or more embodiments of the invention. One or more steps in FIG. 3 may be executed by one or more components in FIG. 1 (e.g., COU (104), scrubber application (114), etc.). While the various steps in this flowchart are presented and described sequentially, one of ordinary skill will appreciate that some or all of the steps may be executed in different orders, may be combined or omitted, and some or all of the steps may be executed in parallel.

Initially, it is determined whether the request is a write (Step 302). When it is determined that the request is not a write request (i.e., the request is read), the request is tagged indicative of the old addressing scheme (Step 310). Specifically, the read request is tagged indicative of the old addressing scheme because the memory address specified in the request matches the barrier address, and content stored at the barrier address has not yet been migrated to a new memory location addressed by the new memory scheme. In Step 312, the read request having an attached/appended tag is sent to the MCUs and interpreted by the MCUs according to old addressing scheme because of the tag. When it is determined that the request is a write request, the process proceeds to Step 304.

In Step 304, the write request is tagged indicative of new addressing scheme. Specifically, the write request is tagged because the memory address specified in the request matches the barrier address and the write request is not attempting to read the content stored at the barrier address.

In Step 306, the write request matching the barrier address, having an attached/appended tag, is sent to the MCUs and interpreted by the MCUs according to the new addressing scheme because of the tag. As discussed above, the addressing scheme is a mapping operation to identify the corresponding entry/location in the appropriate MM that corresponds to the specified address. The data in the write request may be written to the entry/location identified through the mapping operation. As also discussed above, it is through write requests for the barrier address that the relocation occurs.

In Step 308, the barrier pointer is updated in accordance with one or more embodiments of the invention. In other words, the barrier pointer is incremented or decremented to reference the next un-migrated address.

Figure 4:
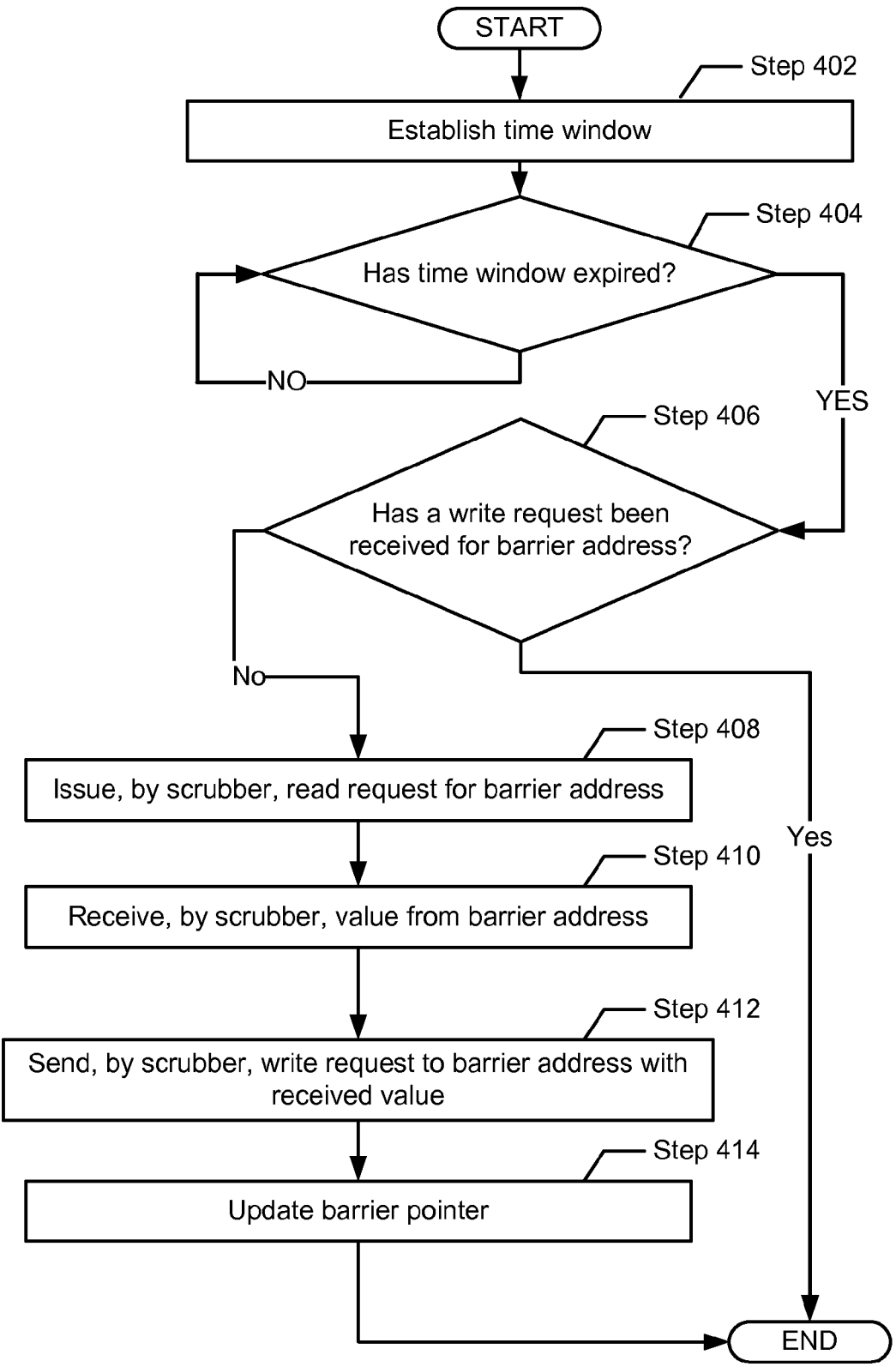

FIG. 4 shows a flowchart in accordance with one or more embodiments of the invention. One or more steps in FIG. 4 may be executed by one or more components in FIG. 1 (e.g., COU (104), scrubber application (114), etc.). While the various steps in this flowchart are presented and described sequentially, one of ordinary skill will appreciate that some or all of the steps may be executed in different orders, may be combined or omitted, and some or all of the steps may be executed in parallel.

Initially, the scrubber application establishes a time window (Step 402). The time window is established in response to the barrier pointer being updated. The time window may be of any duration (e.g., 5 msecs, 10 seconds, 3 cycles, etc.).

In Step 404, it is determined by the scrubber application whether the time window has expired. If the time window has not yet expired, the process returns to Step 404. However, if the time window has expired, the process proceeds to Step 406.

In Step 406, it is determined by the scrubber application whether a write request was received for the barrier address during the time window. When it is determined that a write request for the barrier address was received during the time window, and thus the barrier pointer has recently been updated, the process depicted in FIG. 4 might end. Alternatively, when it is determined that a write request for the barrier address was not received during the time window, and thus the barrier pointer has not been updated since the time window was established, the process proceeds to Step 408.

In one or more embodiments, Step 404 and Step 406 may be merged. In such embodiments, the time window is promptly terminated upon the arrival of a write request for the barrier address, and the process proceeds to Step 408.

In Step 408, the scrubber application issues a read request for the barrier address. The read request will be received by the COU, and the read request for the barrier address will not be tagged. Accordingly, the barrier address will be interpreted according to the first (old) addressing scheme, and the barrier pointer will not be updated.

In Step 410, the scrubber application receives the value stored in the memory location corresponding to the barrier address in response to the read request.

In Step 412, the scrubber application issues a write request for the barrier address including the data value (i.e., the data value received in Step 410). The write request will be received by the COU, and the write request for the barrier address will be tagged. Accordingly, the barrier address will be interpreted according to the second (new) addressing scheme. Moreover, the data value will be stored in the memory location identified by the second addressing scheme. In other words, this write request incrementally advances the relocation process.

In Step 414, the barrier pointer is updated. Specifically, the barrier pointer is incremented (or decremented) to reference the next un-migrated address within the set of addresses. This change in the barrier pointer occurs automatically as part of the normal operation of the COU in response to the write request. The scrubber application does not have direct access to the barrier pointer and cannot simply set the barrier pointer to any value.

One or more embodiments of the invention may have the following advantages: the ability to migrate between different addressing schemes without rebooting or halting memory traffic; the ability to partition addresses into migrated and un-migrated addresses using a barrier pointer; the ability to select an addressing scheme by placing a tag on an access request that is indicative of an old addressing scheme or a new addressing scheme; the ability to force the barrier pointer to update using a scrubber application; etc.

Figure 5:
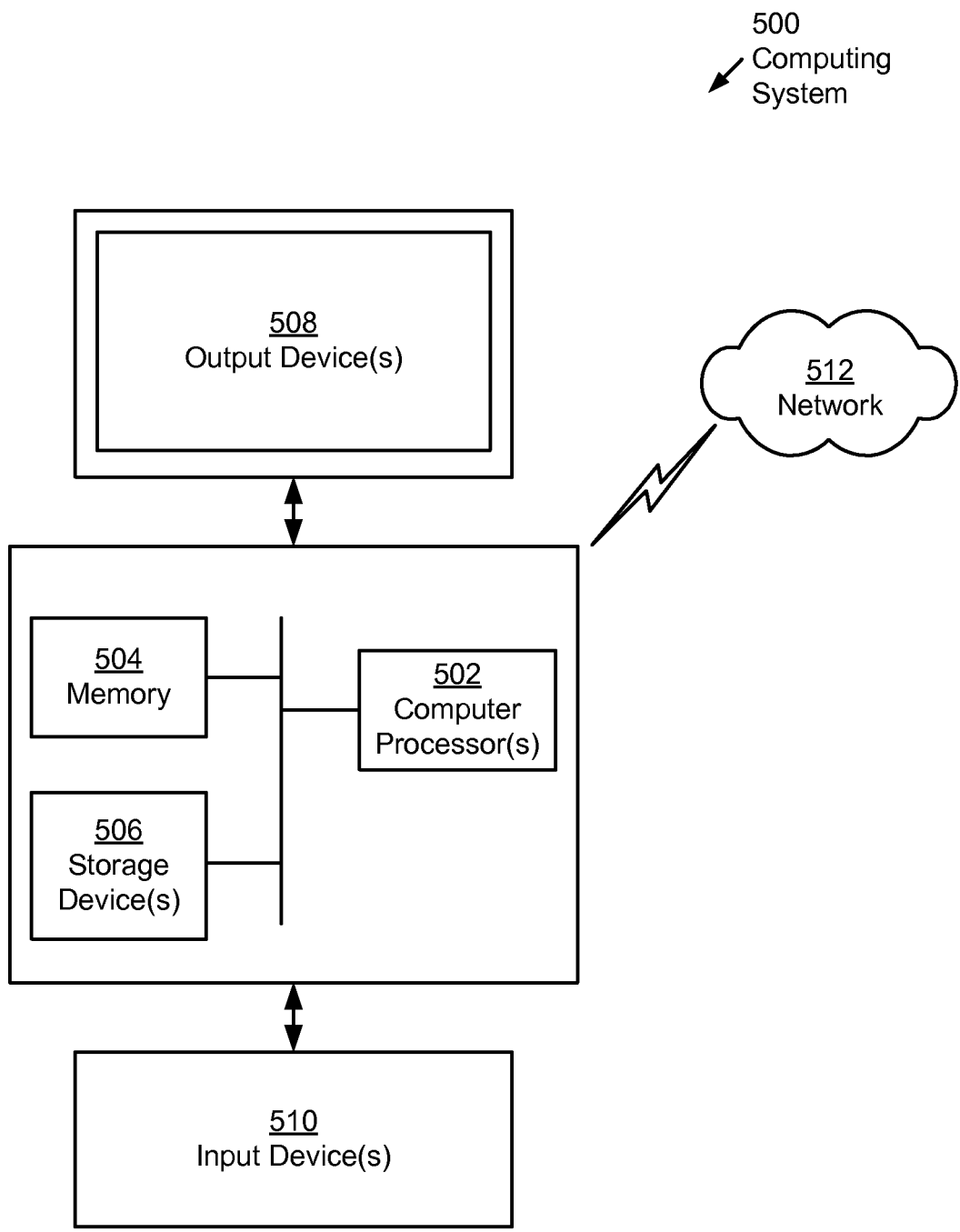
FIG. 5 shows a computer system in accordance with one or more embodiments of the invention.

Embodiments of the invention may be implemented on virtually any type of computing system regardless of the platform being used. For example, the computing system may be one or more mobile devices (e.g., laptop computer, smart phone, personal digital assistant, tablet computer, or other mobile device), desktop computers, servers, blades in a server chassis, or any other type of computing device or devices that includes at least the minimum processing power, memory, and input and output device(s) to perform one or more embodiments of the invention. For example, as shown in FIG. 5, the computing system (500) may include one or more computer processor(s) (502), associated memory (504) (e.g., random access memory (RAM), cache memory, flash memory, etc.), one or more storage device(s) (506) (e.g., a hard disk, an optical drive such as a compact disk (CD) drive or digital versatile disk (DVD) drive, a flash memory stick, etc.), and numerous other elements and functionalities. The computer processor(s) (502) may be an integrated circuit for processing instructions. For example, the computer processor(s) may be one or more cores, or micro-cores of a processor. The computing system (500) may also include one or more input device(s) (510), such as a touchscreen, keyboard, mouse, microphone, touchpad, electronic pen, or any other type of input device. Further, the computing system (500) may include one or more output device(s) (508), such as a screen (e.g., a liquid crystal display (LCD), a plasma display, touchscreen, cathode ray tube (CRT) monitor, projector, or other display device), a printer, external storage, or any other output device. One or more of the output device(s) may be the same or different from the input device(s). The computing system (500) may be connected to a network (514) (e.g., a local area network (LAN), a wide area network (WAN) such as the Internet, mobile network, or any other type of network) via a network interface connection (not shown). The input and output device(s) may be locally or remotely (e.g., via the network (512)) connected to the computer processor(s) (502), memory (504), and storage device(s) (506). Many different types of computing systems exist, and the aforementioned input and output device(s) may take other forms.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that when executed by a processor(s), is configured to perform embodiments of the invention.

Further, one or more elements of the aforementioned computing system (500) may be located at a remote location and connected to the other elements over a network (514). Further, embodiments of the invention may be implemented on a distributed system having a plurality of nodes, where each portion of the invention may be located on a different node within the distributed system. In one embodiment of the invention, the node corresponds to a distinct computing device. Alternatively, the node may correspond to a computer processor with associated physical memory. The node may alternatively correspond to a computer processor or micro-core of a computer processor with shared memory and/or resources.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for migration from a first addressing scheme to a second addressing scheme, comprising:
  receiving, by a coherence ordering unit (COU), a first request to access a first memory address and a second request to access a second memory address;
  comparing, by the COU, the first memory address and the second memory address with a barrier pointer referencing a barrier address,
  wherein the first memory address, the second memory address, and the barrier address are different, and wherein the barrier address separates migrated addresses and un-migrated addresses;
  tagging, by the COU, the first request with a first tag indicative of the first addressing scheme in response to the first memory address being on an un-migrated side of the barrier address;
  tagging, by the COU, the second request with a second tag indicative of the second addressing scheme in response to the second memory address being on a migrated side of the barrier address; and
  sending, by the COU, the first request to a first memory controller unit (MCU) and the second request to a second MCU,
  wherein the first MCU interprets the first memory address according to the first addressing scheme in response to the first tag, and
  wherein the second MCU interprets the second memory address according to the second addressing scheme in response to the second tag.

2. The method of claim 1, further comprising:
  receiving a third request for write access to the barrier address;
  tagging the third request with the second tag;
  sending, by the COU, the third request for interpretation after tagging the third request; and
  incrementing the barrier pointer to reference a new barrier address in response to the third request,
  wherein the migrated addresses are below the new barrier address.

3. The method of claim 1, further comprising:
  receiving, by the COU and from a scrubber application, a read request directed towards the barrier address,
  wherein the first request, the second request, and the third request are from a user application;
  sending a value stored at the barrier address to the scrubber application in response to the read request;
  receiving, by the COU and from the scrubber application, a write request comprising the value and directed toward the barrier address;
  tagging, by the COU, the write request with the second tag;
  sending the write request for interpretation; and
  incrementing the barrier pointer to reference a new barrier address in response to the write request,
  wherein the migrated addresses are below the new barrier address.

4. The method of claim 3, further comprising:
  incrementing the barrier pointer to reference the barrier address before the read request directed towards the barrier address is received from the scrubber;
  triggering a time window in response to incrementing the barrier pointer to reference the barrier address; and
  issuing, by the scrubber, the read request in response to expiration of the time window,
  wherein the COU does not receive a request to access the barrier address during the time window.

5. The method of claim 1, wherein:
  memory migration is triggered by a failure of a memory module of a plurality of interleaved memory modules; and
  the plurality of interleaved memory modules has a cardinality of $2^N$.

6. The method of claim 5, wherein N is equal to 4.

7. The method of claim 5, wherein incrementing the barrier pointer comprises adding $2^N$ to the barrier pointer.

8. The method of claim 5, further comprising:
generating a data structure of addresses referring to the entries in the memory module,
wherein incrementing the barrier pointer comprises advancing the barrier pointer by one to the next address in the data structure.

9. The method of claim 5, wherein the memory module is a DIMM.

10. The method of claim 1, wherein the first addressing scheme is 16 way interleaved mapping, and wherein the second addressing scheme is 15 way interleaved mapping.

11. A system for migration from a first addressing scheme to a second addressing scheme, the system comprising:
a user application configured to:
issue a first request to access a first memory address; and
issue a second request to access a second memory address;
a coherence ordering unit (COU) comprising a barrier pointer referencing a barrier address and configured to:
compare the first memory address and the second memory address with the barrier address, wherein the barrier address separates migrated addresses and un-migrated addresses, and wherein the first memory address, the second memory address, and the barrier address are different;
place a first tag indicative of the first addressing scheme on the first request in response to the first memory address being on an un-migrated side of the barrier address; and
place a second tag indicative of the second addressing scheme on the second request in response to the second memory address being on a migrated side of the barrier address; and
a first memory controller (MC) connected to the COU and configured to interpret the first request according to the first addressing scheme in response to the first tag; and
a second MC connected to the COU and configured to interpret the second request according to the second addressing scheme in response to the second tag.

12. The system of claim 11, further comprising:
a scrubber connected to the COU and configured to:
issue a read request directed towards the barrier address;
receive a value in response to the read request; and
issue a write request comprising the value and directed toward the barrier address,
wherein the COU is further configured to:
tag the write request with the second tag;
send the write request for interpretation; and
increment the barrier pointer to reference a new barrier address in response to the write request,
wherein the migrated addresses are below the new barrier address.

13. The system of claim 12, wherein:
the scrubber comprises a timer;
the timer establishes a time window in response to the barrier pointer being incremented;
the read request is issued by the scrubber in response to the expiration of the time window; and
the COU does not receive a request to access the barrier address during the time window.

14. The system of claim 11, further comprising:
a plurality of interleaved memory modules having a cardinality of $2^N$,
wherein memory migration is triggered by a failure of a memory module of the plurality of interleaved memory modules.

15. The system of claim 14, wherein N is equal to 4.

16. The system of claim 14, wherein the memory module is a DIMM.

17. The system of claim 14, wherein the COU further comprises:
a data structure of addresses referring to the entries in the memory module,
wherein incrementing the barrier pointer comprises advancing the barrier pointer by one to the next address in the data structure.

18. The system of claim 11, wherein the first addressing scheme is 16 way interleaved mapping, and wherein the second addressing scheme is 15 way interleaved mapping.

19. A system for migration from a first addressing scheme to a second addressing scheme, the system comprising:
a user application configured to:
issue a first request to access a first memory address; and
issue a second request to access a second memory address;
a coherence ordering unit (COU) configured to:
modify a barrier pointer to reference a barrier address;
compare the first memory address and the second memory address with the barrier address, wherein the barrier address separates migrated addresses and un-migrated addresses, and wherein the first memory address, the second memory address, and the barrier address are different;
place a first tag indicative of the first addressing scheme on the first request in response to the first memory address being on an un-migrated side of the barrier address; and
place a second tag indicative of the second addressing scheme on the second request in response to the second memory address being on a migrated side of the barrier address;
a scrubber connected to the COU and configured to:
establish a time window in response to the barrier pointer being modified;
issue a read request directed towards the barrier address in response to expiration of the time window;
receive a value in response to the read request; and
issue a write request comprising the value and directed toward the barrier address;
a first memory controller (MC) connected to the COU and configured to interpret the first request according to the first addressing scheme in response to the first tag; and
a second MC connected to the COU and configured to interpret the second request according to the second addressing scheme in response to the second tag.

20. The system of claim 19, wherein:
the migrated addresses are above the barrier address;
modifying the barrier pointer comprises decrementing the barrier pointer; and
migration from the first addressing scheme to the second addressing scheme is triggered by failure of a memory module in a plurality of interleaved memory modules.

* * * * *